(12) United States Patent
Lebaredian et al.

(10) Patent No.: US 12,205,210 B2
(45) Date of Patent: Jan. 21, 2025

(54) CONVERSATIONAL AI PLATFORM WITH RENDERED GRAPHICAL OUTPUT

(71) Applicant: NVIDIA Corporation, Santa Clara, CA (US)

(72) Inventors: Rev Lebaredian, Los Gatos, CA (US); Simon Yuen, Playa Vista, CA (US); Santanu Dutta, Sunnyvale, CA (US); Jonathan Michael Cohen, Mountain View, CA (US); Ratin Kumar, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 54 days.

(21) Appl. No.: 17/318,871

(22) Filed: May 12, 2021

(65) Prior Publication Data

US 2021/0358188 A1    Nov. 18, 2021

Related U.S. Application Data

(60) Provisional application No. 63/024,499, filed on May 13, 2020.

(51) Int. Cl.
*G06T 13/00* (2011.01)
*G10L 13/08* (2013.01)
(Continued)

(52) U.S. Cl.
CPC .............. *G06T 13/00* (2013.01); *G10L 13/08* (2013.01); *H04L 51/02* (2013.01); *G10L 15/08* (2013.01)

(58) Field of Classification Search
CPC ......... G06T 13/00; G10L 13/08; G10L 15/08; G10L 13/00; H04L 51/02; G06F 40/216;
(Continued)

(56) References Cited

U.S. PATENT DOCUMENTS 6,570,555 B1 * 5/2003 Prevost .................. G06F 3/038
345/156
8,228,335 B1 * 7/2012 Jacob ..................... G06T 13/20
345/473
(Continued)

FOREIGN PATENT DOCUMENTS

CN         105721668 A      6/2016
EP         3 381 175 A1     10/2018
(Continued)

OTHER PUBLICATIONS

International Search Report and Written Opinion received for PCT Patent Application No. PCT/US2021/032068, mailed on Aug. 23, 2021, 22 pages.
(Continued)

*Primary Examiner* — Said Broome
*Assistant Examiner* — Donna J. Ricks
(74) *Attorney, Agent, or Firm* — Taylor English Duma L.L.P.

(57) ABSTRACT

In various examples, a virtually animated and interactive agent may be rendered for visual and audible communication with one or more users with an application. For example, a conversational artificial intelligence (AI) assistant may be rendered and displayed for visual communication in addition to audible communication with end-users. As such, the AI assistant may leverage the visual domain—in addition to the audible domain—to more clearly communicate with users, including interacting with a virtual environment in which the AI assistant is rendered. Similarly, the AI assistant may leverage audio, video, and/or text inputs from a user to determine a request, mood, gesture, and/or posture of a user for more accurately responding to and interacting with the user.

37 Claims, 10 Drawing Sheets

(51) Int. Cl.
*G10L 15/08* (2006.01)
*H04L 51/02* (2022.01)

(58) Field of Classification Search
CPC .......... G06F 40/30; G06F 40/35; G06F 3/167; G06Q 30/0601
See application file for complete search history.

(56) References Cited

U.S. PATENT DOCUMENTS

| | | | |
|---|---|---|---|
| 9,886,953 B2* | 2/2018 | Lemay | G06F 3/167 |
| 10,264,214 B1* | 4/2019 | Kumar | H04N 7/157 |
| 2010/0082345 A1 | 4/2010 | Wang et al. | |
| 2014/0356822 A1* | 12/2014 | Hoque | G09B 19/04 434/185 |
| 2017/0206095 A1* | 7/2017 | Gibbs | G06N 3/006 |
| 2019/0087736 A1* | 3/2019 | Kita | G06N 20/00 |
| 2019/0095775 A1* | 3/2019 | Lembersky | G06N 20/00 |
| 2019/0102782 A1 | 4/2019 | Diehl | |
| 2019/0205727 A1* | 7/2019 | Lin | G06F 18/217 |
| 2020/0098188 A1* | 3/2020 | Bar-Zeev | G06T 19/006 |
| 2020/0312004 A1* | 10/2020 | Han | G06V 40/103 |
| 2021/0021558 A1* | 1/2021 | Mahmoud | H04L 51/046 |
| 2021/0221502 A1* | 7/2021 | Godi | B64C 39/024 |
| 2021/0302922 A1* | 9/2021 | Joosten | B25J 9/1697 |
| 2021/0366462 A1* | 11/2021 | Yang | G06F 40/30 |
| 2022/0293102 A1* | 9/2022 | Lee | G06F 40/30 |

FOREIGN PATENT DOCUMENTS

| | | | | | |
|---|---|---|---|---|---|
| GB | 2581886 | A | * | 3/2020 | G10L 15/25 |
| JP | 2018206431 | A | * | 12/2018 | G06F 13/00 |
| WO | WO 03058518 | A2 | * | 7/2003 | G06F 17/60 |
| WO | WO-2019014507 | A1 | * | 1/2019 | G06F 3/167 |
| WO | 2019/099397 | A1 | | 5/2019 | |
| WO | WO 2021003471 | A1 | * | 1/2021 | G01L 15/22 |

OTHER PUBLICATIONS

U.S. Appl. No. 15/809,849, entitled "Systems and Methods for Gaze Tracking," filed Nov. 10, 2017.
U.S. Appl. No. 15/826,430, entitled "Machine Learning Technique for Automatic Modeling of Multiple-Valued Outputs," filed Nov. 29, 2017.
U.S. Appl. No. 62/648,358, entitled "Systems and Methods for Advanced AI-Assisted Vehicles," filed Mar. 26, 2018.
U.S. Appl. No. 62/717,730, entitled "Cloud-Centric Platform for Collaboration and Connectivity," filed Aug. 10, 2018.
U.S. Appl. No. 16/137,064, entitled "Learning-Based Camera Pose Estimation From Images of an Environment," filed Sep. 20, 2018.
U.S. Appl. No. 62/742,923, entitled "System and Methods for Gaze, Body, and Gesture Recognition in Advanced AI-Assisted Vehicles," filed Oct. 8, 2018.
U.S. Appl. No. 16/363,648, entitled "Managing Glare in Image Detection Using Artificial Intelligence," filed Mar. 25, 2019.
U.S. Appl. No. 62/879,901, entitled "Real-time Ray Tracing Renderer for Omniverse," filed Jul. 29, 2019.
U.S. Appl. No. 16/538,594, entitled "Platform and Method for Collaborative Generation of Content," filed Aug. 12, 2019.
U.S. Appl. No. 62/948,789, entitled "Gaze Determination Machine Learning System Having Adaptive Weighting of Inputs," filed Dec. 16, 2019.
U.S. Appl. No. 62/948,793, entitled "Gaze Determination Using Glare as Input," filed Dec. 16, 2019.
U.S. Appl. No. 62/948,796, entitled "Method and Apparatus for Gaze Determination and Applications Thereof," filed Dec. 16, 2019.
U.S. Appl. No. 16/773,883, entitled "Automatically-Adjusting Mirror for use in Vehicles," filed Jan. 27, 2020.
U.S. Appl. No. 16/826,269, entitled "Cloud-Centric Platform for Collaboration and Connectivity on 3D Virtual Environments," filed Mar. 22, 2020.
U.S. Appl. No. 63/010,511, entitled "GAN-assisted Video Compression and Broadcast," filed Apr. 15, 2020.
U.S. Appl. No. 16/859,741, entitled "Systems and Methods for Performing Operations in a Vehicle Using Gaze Detection," filed Apr. 27, 2020.
U.S. Appl. No. 16/867,395, entitled "Systems and Methods for Performing Commands in a Vehicle Using Speech and Image Recognition," filed May 5, 2020.
Lebaredian, Rev; Notice of International Preliminary Report on Patentability for PCT Application No. PCT/US2021/032068, filed May 12, 2021, mailed Nov. 24, 2022, 19 pgs.
Lebaredian, Rev; First Office Action for Chinese Patent Application No. 202180005981.7, filed Apr. 14, 2022, mailed Aug. 1, 2024, 25 pgs.

* cited by examiner

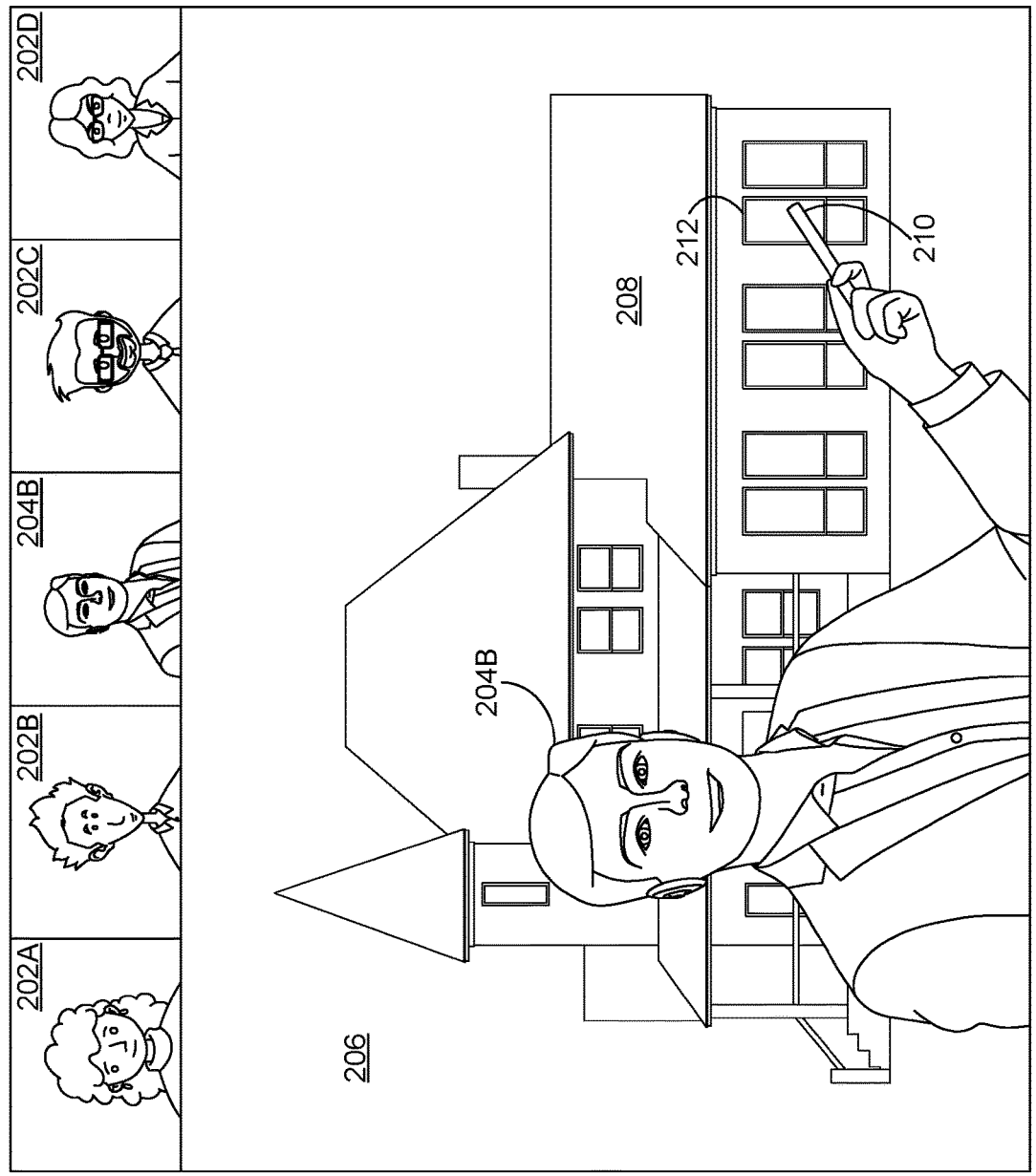

CONVERSATIONAL AI PLATFORM WITH RENDERED GRAPHICAL OUTPUT

CROSS-REFERENCE TO RELATED APPLICATIONS

This application claims the benefit of U.S. Provisional Application No. 63/024,499, filed on May 13, 2020, which is hereby incorporated by reference in its entirety.

BACKGROUND

Conversational artificial intelligence (AI) assistants are becoming more ubiquitous across various platforms for fulfilling verbal requests of users. For example, smart devices—such as phones, computers, tablets, displays, and speakers—may leverage AI assistants for interacting with a user's verbal requests for information (e.g., weather, news, financial information, etc.) and/or for activations of the smart device or a communicatively coupled device (e.g., playing a song, arming a security system, ordering an item, etc.). In addition, these AI assistants may display information responsive to the requests on a display—e.g., load a webpage, execute a graphical user interface of a music application, provide a visual indicator of a task being complete, display a requested video clip, show, or movie, etc.

However, these AI assistants generally do not include a graphical representation or visual personification of the AI assistant itself, resulting in a distinctly impersonal interaction. This is further exacerbated by the reliance on verbal inputs from users, which do not allow the underlying AI to appropriately analyze a mood, posture, tone, or movement of the user during the interaction. For example, even where a device includes a camera, information from the camera—or other modalities—is not leveraged during the interaction to more appropriately respond to the request of the user. Similarly, due to the AI assistant being expressed in audio form only, contextual information—e.g., from graphical information—may not be gleaned from the response of the AI assistant. Further, AI assistants generally require a voice trigger or button activation to indicate a start of a request, and then require another instance of the trigger for any follow up request or interaction. As such, these AI assistants require a structured set of inputs to produce a structured set of outputs—most commonly manifesting as simple question and answer exchanges—essentially removing the underlying aspects of personalized human interaction.

In addition, a single AI assistant is generally tasked with responding to requests in a variety of different domains—e.g., food ordering, timer setting, disabling of an alarm system, playing music, etc. However, because the single AI assistant is responsible for an entire universe of possible domains, requests are often routed to a rule set of a wrong domain for the request, thereby resulting in an improper or inaccurate response. As a result, these AI assistants may prove ineffective in certain domains even where the AI assistant may have a path (e.g., via a domain specific application programming interface (API)) to the requisite knowledge—e.g., due to improper routing of the request.

SUMMARY

In contrast to conventional systems, such as those described above, the systems and methods of the present disclosure provide a platform and pipeline for hosting or integrating a conversational AI assistant within any application that includes an audio, video, and/or textual output device. For example, the conversational AI assistant may be managed using a system executing separately from any specific application, and may be integrated with the application using video, audio, text, and/or input from a user input device. As such, the audio, text, video, and/or user input data from users may be received by the system, processed, and used to render video, audio, and/or textual responses of the AI agent that may be displayed or otherwise output by one or more devices (e.g., displays, speakers, etc.) associated with executing the application. Using audible, visual, and/or textual information to analyze a conversation may also enable interaction with the AI agent without the requirement for a verbal trigger or physical gesture by a user to initiate a conversation or interaction. For example, lip movement, gaze direction, eye contact (gaze focus), verbal cues, hand gestures, body poses, and/or other physiological or auditory information may be processed to determine when to activate and deactivate the AI agent—thereby enabling more natural conversational interactions with the AI agent without overreaching or encroaching unnecessarily on the user's right to privacy. The background processing and rendering of the AI agent further enables the agent to be application agnostic in that dedicated application programming interfaces (APIs) are not required to execute the AI agent within an application—e.g., so long as the application is configured to display video and/or output text or audio, the AI agent may be implemented using a simulated or virtual camera, microphone, keyboard, and/or other simulated or virtual devices.

In addition, due to the graphically rendered state of the AI agent, the AI agent may communicate using audio, video, and/or text—thereby providing a more immersive interpersonal aspect to the AI agent. For example, one or more neural networks or machine learning techniques may be used to determine a visual and/or audible response for the AI agent, and the audible response may be combined with the visual response (e.g., using lip synchronization, gestures, etc.) to render the AI agent in a more interactive form. Further, the AI agent may be placed in a setting or location that may further be used to leverage a more immersive response and interaction, such as by interacting with virtual objects in the rendered scene of the AI agent—e.g., where an AI agent is presenting an architectural design, the AI agent may have a rendered version of the design to interact with, navigate around, or graphically manipulate as requests are received from one or more viewers.

In further contrast to conventional systems, different AI agents may be leveraged for different domains, where the particular AI agent may be selected by request (e.g., by name) and/or based on audible, textual, and/or visual input from a user (e.g., an analysis of the conversation may aid in determining which AI agent instance to render). As a result, the visual appearance of the AI agent may provide context as to the domain in which the AI agent operates, and any number of different AI agents may be rendered for any particular application and/or at any one time.

BRIEF DESCRIPTION OF THE DRAWINGS

The present systems and methods for a virtually animated and interactive agent are described in detail below with reference to the attached drawing figures, wherein:

FIGS. 2A-2E depict example visualizations of AI assistants for various applications, in accordance with some embodiments of the present disclosure;

DETAILED DESCRIPTION

Systems and methods are disclosed related to a virtually animated and interactive agent. The artificial intelligence (AI) agent(s) described herein may be implemented in any number of technology spaces and within any number of applications including but not limited to those described herein. For example, the AI agent(s) described herein may be implemented for video conferencing applications (e.g., to participate in conversation for answering questions, displaying information, etc.), smart speaker and/or smart display applications (e.g., for playing music, videos, controlling coupled devices, placing order, providing information, etc.), vehicle (e.g., autonomous, semi-autonomous, non-autonomous, etc.) applications (e.g., for in-vehicle controls, interactions, information, etc.), restaurant applications (e.g., for ordering, interacting with a menu, etc.), retail applications (e.g., for store information, item information, etc.), web applications (e.g., for assisting in navigating a web page), computer aided design or architectural applications (e.g., for manipulating, interacting with, and/or displaying designs, models, etc.), customer service applications (e.g., use video calls to speak to a rendered AI customer service agent), and/or in other technology spaces or applications.

Figure 1A:
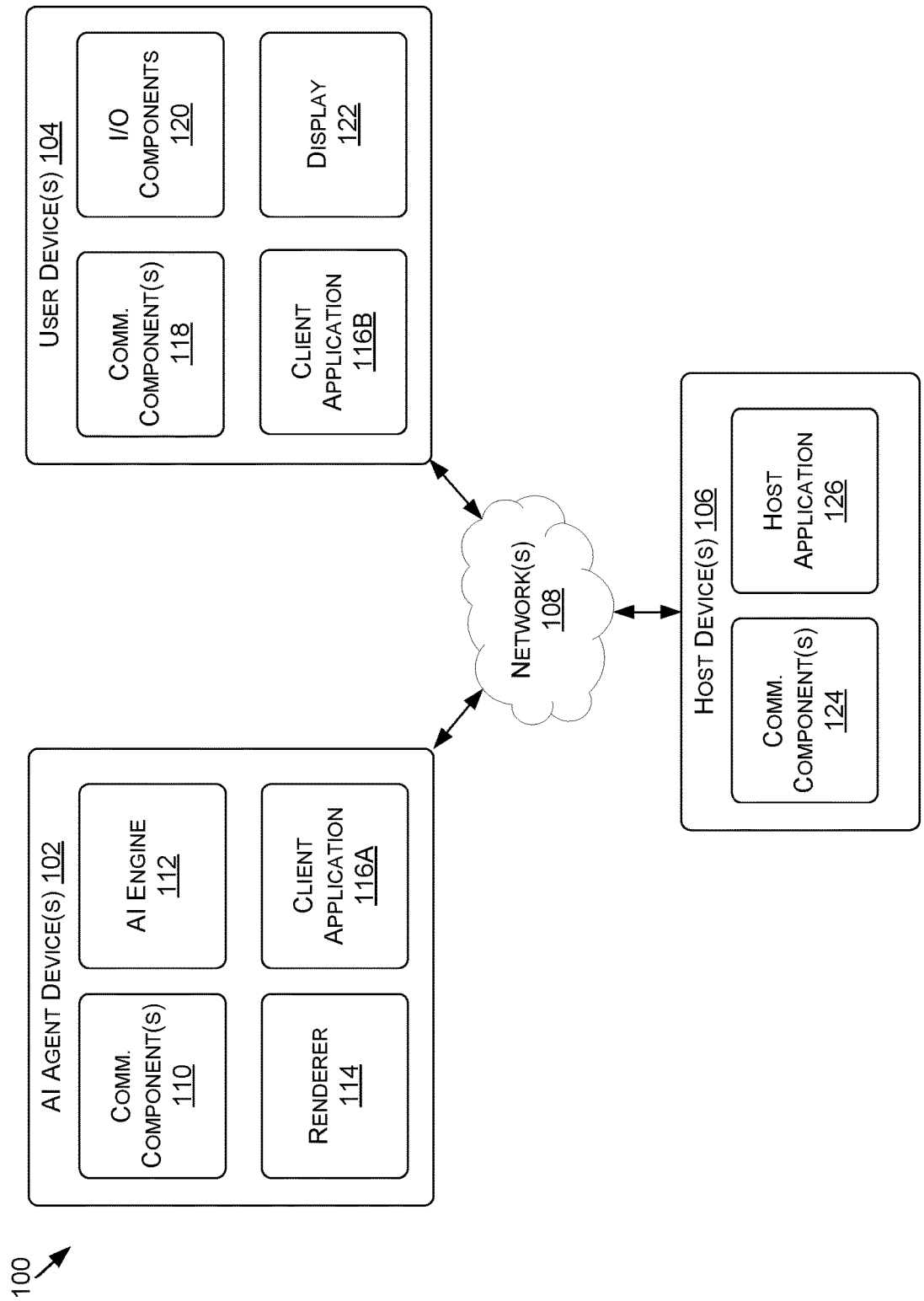
FIG. 1A depicts an example AI assistant system, in accordance with some embodiments of the present disclosure.

With reference to FIG. 1A, FIG. 1A is an example AI assistant system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, at least some of the features, functionality, and/or components described herein with respect to FIG. 1A may be implemented using similar features, functionality, and/or components as described with respect to example computing device 400 of FIG. 4 and/or example data center 500 of FIG. 5.

The system 100 may include, among other things, an AI device(s) 102, a user device(s) 104, and/or a host device(s) 106. Although only a single AI agent device(s) 102, a single user device(s) 104, and a single host device(s) 106 are illustrated in FIG. 1A, this is not intended to be limiting, and any number of devices may be implemented within the system 100. In addition, although each of the AI agent device(s) 102, the user device(s) 104, and the host device(s) 106 are illustrated as separate devices from one another, this is not intended to be limiting. For example, depending on the embodiment, one or more of the devices may be combined into a single device (or set of devices, such as in a cloud computing environment). As a non-limiting example, in a video conferencing application, the AI agent device(s) 102 may include one or more devices (e.g., servers in a cloud computing environment) that support the AI agent(s) communicating within a conference, the user device(s) 104 may include personal devices of users for communicating within the conference, and the host device(s) 106 may include one or more devices (e.g., servers in a cloud computing environment) that host the conference (e.g., using a host application 126 including one or more application programming interfaces (APIs)). As another non-limiting example, in an automotive application, the AI agent device(s) 102, the user device(s) 104, and the host device(s) 106 may include a single device (e.g., a supercomputer within the vehicle), or may include a combination of a vehicle-located device (e.g., the supercomputer) and a remotely located device (e.g., one or more servers in a cloud computing environment) that communicate with the vehicle-located device for updates, responses to more complex tasks, etc. As such, the AI agent device(s) 102, the user device(s) 104, and the host device(s) 106 may be owned, operated, and/or supported by a same user or company, different users or companies, and/or a combination thereof.

The AI agent device(s) 102 may include a server, a network attached storage (NAS), an API, a backend device, and/or another type of device. The AI agent device(s) 102 may support the functionality of the AI agent or assistant—such as those described herein. As such, in some embodiments, some or all of the components, features, and/or functionality of the AI agent device(s) 102 may be executed locally on user device(s) 104. For example, certain tasks, requests, interactions, and/or conversations between a user and the AI agent on the user device(s) 104 may be handled locally on the user device(s) 104. In embodiments, some or all of the components, features, and/or functionality of the AI agent may be executed by the AI agent device(s) 102 remotely with respect to the user device(s) 104 and/or the host device(s) 106. For example, data from the user device(s) 104 and/or the host device(s) 106 may be received and processed using the AI agent device(s) 102, and a video stream, an audio stream, and/or a textual stream of the response or communication by the AI agent may be transmitted to the user device(s) 104 and/or the host device(s) 106.

The user device(s) 104 may include a smartphone, a laptop computer, a tablet computer, a desktop computer, a wearable device, a game console, a smart-home device that may include an AI agent or assistant, and/or another type of device. In some examples, the user device(s) 104 may include a combination of devices (e.g., a smartphone and a communicatively coupled smart watch or other wearable device), and the applications associated therewith, including interactions with the application, may be executed using one or more of the devices (e.g., smartphone application pushes notification to smartwatch application, user provides input to smartwatch, data representative of input is passed to another device of the system 100 via the smartphone).

The host device(s) 106 may include a server, a network attached storage (NAS), an API, a backend device, a device similar to the user device(s) 104 described herein, and/or another type of device. The host device(s) 106 may support the functionality of a host application 126 by which interactions between the AI agent and one or more end users—e.g., via the user device(s) 104—are communicated. For example, in a video conferencing application, the host device(s) 106 may host the video conferencing application, and the AI agent device(s) 102 may support an AI agent(s) as a participant(s) in a particular conference while the user device(s) 104 may support a user(s) as another participant(s) in the conference—e.g., as described with respect to video conferencing system 100B of FIG. 1B. As another example, in a fast-food ordering application, the host application 126 may include an interactive menu in which an AI agent aids a user in navigating the menu for selecting one or more items. According to such embodiments, the host device(s) 106 may be positioned locally at (proximately to) the restaurant, and may be implemented as, for example and without limitation, a computing device communicatively coupled to I/O components 120 of an ordering apparatus or kiosk. The AI agent device(s) 102 may be located remotely (and/or locally), and utilized for processing data generated based on user input (e.g., voice, text, video, etc.) and generating a response or interactions by the AI agent. According to one or more embodiments, the user device(s) 104 may not be required; alternatively, the user device(s) 104 may be a device of a user for interacting with the host device(s) 106 (e.g., providing touch inputs to a client application 116B associated with the host device(s) 106).

The AI agent device(s) 102, the user device(s) 104, the host device(s) 106, and/or other components of the system 100 may communicate over network(s) 108. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In some embodiments, AI agent device(s) 102, the user device(s) 104, and/or the host device(s) 106 may communicate over a WAN (e.g., the Internet) via a LAN (e.g., Wi-Fi, Ethernet, etc.) and/or a cellular network (e.g., 4G, LTE, 5G, etc.)—e.g., where the system 100 is implemented in a cloud-based or distributed computing environment.

The communication component(s) 110, 118, and/or 124 may include one or more components, features, and/or functionality for communicating across one or more of the networks 108, such as but not limited to those described herein. As a non-limiting example, the user device(s) 104 may use an Ethernet and/or Wi-Fi connection through a router, or a cellular connection through one or more cell towers, to access the Internet in order to communicate with the AI agent device(s) 102 and/or the host device(s) 106. The AI agent device(s) 102 and/or the host device(s) 106—e.g., when corresponding to servers or other computing devices in a cloud-based data center—may access the Internet over Ethernet. As such, the communication component(s) 110, 118, and/or 124 may be configured for communication over one or more network types, and may enable communication between and among the various devices of the system 100 over one or more network types.

Client application 116A, client application 116B, and host application 126 may correspond to different instances of an associated application. For example, in a video conferencing implementation of the system—such as described with respect to FIG. 1B—the client application 116A and 116B may correspond to respective instances of the video conferencing application that enable the AI agent device(s) 102 and the user device(s) 104, respectively, to join a video conference. Similarly, the host application 126 may correspond to the host of the video conference, which may include one or more APIs, for exchanging data between and among the various connected devices.

The AI agent device(s) 102 may leverage any number of parallel processing units for analyzing incoming data, processing the data, and determining output data—e.g., text-to-speech audio data and corresponding changes to the AI agent within a virtual environment—that may be rendered and transmitted (e.g., via a video stream, a textual stream, and/or an audio stream) to one or more user device(s) 104 for display and/or output. Suitable parallel processing units may include one or more graphics processing units (GPUs) in a GPU-accelerated AI environment. The GPUs may be leveraged by the AI engine 112 and/or the renderer 114, as described herein, and/or by other components of the system 100. In addition, in some embodiments, the AI agent device(s) 102—and/or other devices—may leverage video compression techniques for optimizing the transmission of video data. In one or more embodiments, suitable video compression techniques may include compression techniques optimized for video conferencing applications. Such techniques include some or all of the components, features, and/or functionality as described in U.S. Provisional Patent Application No. 63/010,511, filed on Apr. 15, 2020, which is hereby incorporated by reference in its entirety.

The AI engine 112 of the AI agent device(s) 102 may process incoming textual, audio, and/or image data (e.g., multimodal data) to determine what is being communicated textually, audibly, and/or visually, and to determine whether a response or output is necessary by the AI agent, what response should be output where an output is determined, and/or how to output the response (e.g., to determine a tone, emotion, gesture, animation, etc. of the AI agent). In some embodiments, the AI engine 112 may correspond to or be similar to the JARVIS AI platform from NVIDIA Corporation, and/or may include some or all of the components, features, and/or functionality as described in U.S. patent application Ser. No. 15/809,849, filed on Nov. 10, 2017; U.S. patent application Ser. No. 16/137,064, filed on Sep. 20, 2018; U.S. Provisional Patent Application No. 62/648,358, filed on Mar. 26, 2018; U.S. Provisional Patent Application No. 62/742,923, filed on Oct. 8, 2018; U.S. patent application Ser. No. 16/363,648, filed on Mar. 25, 2019; U.S. patent application Ser. No. 16/773,883, filed on Jan. 27, 2020; U.S. Provisional Patent Application No. 62/948,789, filed on Dec. 16, 2019; U.S. Provisional Patent Application No. 62/948,793, filed on Dec. 16, 2019; U.S. Provisional Patent Application No. 62/948,796, filed on Dec. 16, 2019; U.S. patent application Ser. No. 16/859, filed on Apr. 27, 2020; and/or U.S. patent application Ser. No. 16/867,395, filed on May 5, 2020, each of which is hereby incorporated by reference in its entirety.

The AI engine 112 may include an AI system that may use visual cues such as gestures and gaze along with speech in context to determine responses or communications—e.g., visual, audible, mechanical (via a user input device) or textual—within an application. For example, the AI engine 112 may use lip position and motion fused with speech input to identify an active speaker, and gaze may be used to understand if the speaker is engaging the AI agent, other people in the same location as the user, or others participating in an instance of the application. This combination of gaze and lip movement may correspond to an activation trigger, as described in more detail herein. The ability of the AI engine to fuse multimodal data enables simultaneous multi-user, multi-context conversations with the AI agent—e.g., conversations that benefit from a deeper understanding of context than traditional, strictly-verbal communication with AI assistants.

For example, the AI engine 112 may include any number of features for speech tasks such as intent and entity classification, sentiment analysis, dialog modeling, domain and fulfillment mapping, etc. In some embodiments, the AI engine 112 may use natural language processing (NLP) techniques or one or more neural network model to ingest, decipher, perceive, and/or make sense of incoming audio data. For vision, the AI engine 112 may include any number of features for person, face, and/or body (gesture) detection and tracking, detection of key body or facial landmarks and body pose, gestures, lip activity, gaze, and/or other features. The AI engine 112 may further include fused sensory perception, tasks, or algorithms that analyze both audio and images together to make determinations. In embodiments, some or all of the speech, vision, and/or fused tasks may leverage machine learning and/or deep learning models (e.g., NVIDIA's Jarvis and Natural Language Processing Models), that may be trained on custom data to achieve high accuracy for the particular use case or embodiment. The AI agent as managed by the AI engine 112 may be deployed within a cloud-based environment, in a data center, and/or at the edge.

In some embodiments, the AI agent device(s) 102 may generate and render the AI agent—e.g., using the renderer 114—even where communication by the AI agent is not occurring. For example, the renderer 114 may still render image or graphical data corresponding to the virtual AI agent within a virtual environment during an application session even where the AI agent is not currently speaking, moving, or otherwise interacting in response to or based on inputs from a user. In this way, the end-user may still see a display or presentation of the AI agent—and corresponding virtual environment—and understand that the AI agent is available for interaction. In other embodiments, the AI agent may only be displayed or presented when actively speaking, replying, and/or after an activation trigger is satisfied.

The AI engine 112 may, in some embodiments, only process the incoming data for identifying an activation trigger for the AI agent before more heavily processing the incoming data. For example, and to comply with and be respectful of privacy concerns, laws, and/or regulations, an activation trigger may be monitored for by the AI engine before user input (such as speech) is cached (or otherwise stored) and actively processed. The activation trigger may be different depending on particular embodiments, environments, or locations of the AI agent—or the user device(s) 104—the type of I/O component(s) 120 available to the user device(s) 104 (e.g., where no camera is present, the activation trigger may be audible only). In some embodiments, the activation trigger may include more than a single trigger (e.g., activation requires multi-modal triggering) to ensure that privacy concerns are respected, to enable the AI engine 112 to more accurately identify the current speaker for properly responding to any inquiry or conversation, and/or to allow for more conversational context or indicia (e.g., looking at a camera and speaking to activate during conversation is more natural than stopping conversation to speak a specific triggering word or phrase). For example, the activation trigger may include analyzing image data (e.g., streaming video) to determine that a user is looking at the camera (e.g., gaze tracking) and that the user is speaking (e.g., by tracking lip movement). Another activation trigger may include determining that a user is speaking and determining a gesture of the user (e.g., activation may occur when speech is heard and a triggering gesture, such as a wave of the hand, is identified). In some embodiments, such as in an environment where speech—or loud speech—is not allowed (e.g., a library, a religious building, etc.) or a user is incapable of speech, the activation trigger may include a movement or gesture, and/or an input to a device (e.g., a button, a lever, a touch interface, etc.). However, in other embodiments, the activation trigger may include a single non-verbal activation, such as a gesture, a trigger word, lip movement, staring at the camera, etc. In some embodiments, such as where privacy concerns are not an issue or a user has opted in to constant recording of audio and/or video, no trigger activation may be used—although the audio, text, and/or video may still be monitored to determine when a user is addressing the AI agent.

In certain countries, regions, or jurisdictions, the laws, rules, regulations, and/or privacy concerns may not allow for constant recording of audio or speech in public spaces, so the activation triggers may be entirely vision based—e.g., using a rolling buffer. The laws, rules, regulations, and/or privacy concerns of certain countries, regions, or jurisdictions may not allow for constant recording of video and/or audio on private property, but may allow for recording a rolling buffer of video and/or audio, and processing that rolling buffer to determine whether an activation trigger is present. In any embodiment, once an activation trigger is satisfied, the microphones, cameras, and/or other I/O component(s) 120 may be opened up (e.g., activated to listen, monitor, or observe for user input beyond triggering events), and the data may be processed by the AI engine 112 to determine a response and/or other communication. The data may be processed indefinitely, only during a single back and forth communication that requires another trigger to continue the processing, until a deactivation trigger is satisfied (e.g., a trigger word, such as stop, hold on, etc., a trigger gesture, a lack of speech, movement, looking at the camera, or other interactions within a threshold period of perceived inactivity, etc.

The incoming data—e.g., visual, textual, audible, etc.—may be analyzed by the AI engine 112 to determine a textual, visual, and/or audible response or communication—represented using three-dimensional (3D) graphics—for the AI agent. For example, the AI engine 112 may generate output text for text-to-speech processing—e.g., using one or more machine learning or deep learning models—to generate audio data. This audio data may be transmitted to the user device(s) 104—via the host device(s) 106, in embodiments—for output by a speaker or another I/O component(s) 120 of the user device(s) 104. In some embodiments, the audio data may be used to influence the behavior of the AI agent within a virtual environment. For example, the audio data may be used to enable the AI agent to lip synchronize with the audio such that speech of the AI agent appears to emanate from the AI agent naturally, to resemble interpersonal conversation. This may be completed using audio-to-face algorithms or lip-syncing algorithms, that may include machine learning or deep learning models that may drive a 3D graphical facial animation corresponding to the audio output by the AI agent. Suitable audio-to-face algorithms may include some or all of the components, features, and/or functionality as described in U.S. patent application Ser. No. 15/826,430, filed on Nov. 29, 2017, which is hereby incorporated by reference in its entirety.

As such, the AI agent's lips may be controlled with the virtual environment to correspond to the audio data—or at least the portions of the audio representing speech. In addition to the speech, there may be additional audio data corresponding to background noises or sounds, music, tones, ambient noises, other AI agents, virtual bots, and/or other sources. Ultimately, the audio data including the speech of the AI agent and other audio sources may be transmitted—e.g., as an audio stream—to the user device(s) 104 (e.g., via the host device(s) 106, in embodiments).

In addition to audio, a response or communication by an AI agent may include simulated physical movements, gestures, postures, poses, and/or the like that may be represented in the virtual world. The appearance, gestures, movements, posture, and/or other information corresponding to the AI agent—in addition to the virtual environment in which the AI agent is located—may be represented by graphical data. This graphical data may be rendered by the renderer 114 to generate display data or image data that may be streamed to the user device(s) 104 for presentation on a display 122.

The AI engine 112 may determine the simulated physical characteristics of the AI agent based on an analysis of the incoming data, the general type or personality of the AI agent, and/or the determined textual, audible, and/or visual response or communication by the AI agent. For example, where the AI engine 112 determines that a current speaker is angry or sad, this information may be leveraged to simulate the AI agent to respond appropriately (e.g., using a gentle, uplifting, or consoling tone or phrasing). Where the AI engine 112 determines that a certain gesture or posture is fitting to the spoken response of the AI agent, the AI agent may be controlled as such within the virtual environment. As such, a body and/or face of the AI agent may be animated such that the AI agent may emote (express its own set of emotions) for the virtual camera.

Similar to the AI agent, the virtual environment in which the AI agent is located may be generated to aid in the response. For example, where a request for weather in a particular real-world vicinity is received, and the weather is raining, a virtual representation of the location, with cloudy skies and rain falling, may be generated and the AI agent may be made to appear glum (e.g., slouched, with a sad face). Similarly, where a certain song is requested, the AI agent may move or gyrate to the beat of the song and sing the song—e.g., with lip syncing. In some examples, the virtual environment may be updated throughout a single instance of an application or during a single inquiry-response communication. For example, to provide additional context, the virtual environment may be changed to reflect new locations such that the AI agent may appear, in essence, to teleport from one virtual location to another. In some embodiments, where the discussion is better suited for a different domain, in addition to the environment or location changing, the particular AI agent may also change. For example, where a user is asking for information about weather in the city of London, a weather-based AI agent may be represented within a rendered virtual environment corresponding to a skyline of London, and when the user asks a follow up question about the history of London, a history-focused AI agent may be represented within or proximate to a photograph or rendered image of a historical building in London.

In some embodiments, the virtual environment may include a presentation of text, or a document. For example, where a user interacts with an AI agent associated with a bank or other financial institution, the virtual environment may include the AI agent standing in front of or holding a graphical rendering of a bank statement that corresponds to information requested by the user. In such an example, the communication between the user and the AI agent may be more secure as the bank information is not transmitted in an indexable form, and is less structured than, for example, an email with a bank statement. As such, the visual, audible, and/or textual response from the AI agent device(s) 102 may be more secure and private than an email, SMS, or text message communication of the same information.

In some embodiments, the AI agent may interact with objects, features, or items in the virtual environment to aid in the response or interaction with a user. For example, to provide a demonstration to aid in an interaction, the AI agent may virtually interact with the environment. Where an application is being used to discuss an architectural plan, a computer aided design (CAD) application file may be accessed and used to generate a rendering of the virtual environment. For example, the architectural plan may be instantiated within the virtual environment of the AI agent such that the AI agent may interact with the plan or portions/elements of the plan. This may include pointing to features of or moving around within or with respect to the architectural plan. Where the incoming data includes a request to modify a portion of the plan, the AI agent may perform a gesture and the architectural plan may be modified according to the request. For example, where a window is mentioned, without some visual cue, the location of the window and the discussion around the window may be less informative. However, using the AI engine 112, the view of the virtual environment—e.g., from a virtual field of view of a virtual camera—may be updated to include the window of discussion. In addition, the AI agent may point to or otherwise indicate the window that is being talked about, and the system 100 may make updates to the window through communication with the CAD application, which may be fed back to the system 100 for updating the virtual environment based on the updated CAD file.

In some embodiments, in addition to analyzing the incoming textual, visual, user input, and/or audio data from users, user profiles or user information of the users may be accessed to determine textual, audible, and/or visual responses by the AI agent. For example, where a user asks what the weather is, the location information of the user may be leveraged to determine a proper response to the particular location. In such an example, the virtual environment may also be updated to reflect the location—e.g., to include a portion of the location, or an identifying feature of the location, such as the Eiffel Tower in Paris. Similarly, user preferences or other information may be leveraged to appropriately respond to or interact with users. In some embodiments, this information may be gleaned during the instance of the application—e.g., during a video conference—based on user speech, movements, etc. For example, when a user mentions they are at their house in New York City, this information may be stored, such that when the user later asks, "how is the traffic at home?," the response can be based on the already-known location information.

Personalized models may be generated for different users over time, such that the AI engine 112 may learn what a particular user looks like when they are happy, sad, etc., and/or to learn a particular users speech patterns, figures of speech, and/or other user-specific information that may be used to tailor the AI engine 112 to the particular user. This information may be stored in a user profile of the AI agent device(s) 102. Similarly, by studying any number of users, the AI engine 112 and the renderer 114—and/or the underlying machine learning or deep learning models associated therewith—may learn how to effectively emote and/or animate a 3D graphical rendering of the AI agents in the virtual environments such that the AI agents may communicate and appear more human-like. Along the same lines, where the AI agent is to resemble an (anthropomorphic) animal, a robot, an object, etc., the AI engine 112 may learn from data corresponding to the real-world versions of the AI agent in order to more accurately simulate the animal, robot, object, vehicle, etc. in the virtual environment.

The AI engine 112 may support any number of AI agents. For example, different AI agents may be programmed for different domains or skills. As such, a user may request a specific AI agent, or a particular AI agent may be selected by the AI engine 112 based on the incoming data (e.g., where a request is for weather, a weather AI agent may be instantiated, where a request is for finance, a financial AI agent may be instantiated, where a request is for a purchase, a shopping assistant AI may be generated, etc.). As a result of the AI agent corresponding to a particular domain(s), communications between users and the AI agent may be more successful as the requests, commands, questions, inquiries, etc., are more likely to be routed to the proper response or conversational logic and tools for that domain.

The renderer 114 may render display data or image data from the graphical data and/or using one or more models of a virtual environment or world (e.g., data representing the virtual environment or world including a virtual AI agent) for transmission to and/or presentation by the user device(s) 104. In some embodiments, the image data or display data may be rendered to represent a subset of graphical data corresponding to a portion of the virtual environment as captured from a virtual field of view of a virtual camera. In addition, the audio data may be transmitted to and/or output by the user device(s) 104. Further, textual data from the AI agent may be transmitted to and/or displayed by the user device(s) 104. As such, communications—e.g., of textual, visual, and/or audible data—may be exchanged between the client application 116A and the client application 116B, via the host application 126, in embodiments. The display data, image data, textual data, and/or audio data may be transmitted as a stream(s) of data during an instance of the application—e.g., the client application 116A, 116B and the host application 126.

In some embodiments, the renderer 114 may correspond to or be similar to Omniverse Kit from NVIDIA Corporation and/or may be include some or all of the components, features, and/or functionality as described in U.S. Provisional Patent Application No. 62/717,730, filed on Aug. 10, 2018; U.S. patent application Ser. No. 16/538,594, filed on Aug. 12, 2019; U.S. patent application Ser. No. 16/538,594, filed on Mar. 22, 2020; and/or U.S. Provisional Patent Application No. 62/879,901, filed on Jul. 29, 2019, each of which is hereby incorporated by reference in its entirety. For example, the renderer 114 may correspond to an NVIDIA RTX RENDERER.

The renderer 114 may leverage any number of GPUs—and/or nodes thereof—for rendering the display data or image data from the graphical data. For example, ray tracing—e.g., real time ray tracing—and/or path tracing may be executed using one or more GPUs to generate more photo-realistic renderings. The renderer 114 may, in some non-limiting embodiments, use PIXAR'S Universal Scene Description (USD) format and/or another 3D scene description and file format for content creation and interchange between and among various different tools. Once rendered, the graphical and/or audio output may be compressed/encoded before being transmitted to a computing device corresponding to users or participants interacting with the AI agent where the compressed or encoded data is decompressed (decoded) before presentation.

With respect to the user device(s) 104, the input/output (I/O) component(s) 120 may include any type of devices capable of providing inputs, receiving inputs, and/or generating outputs. For example, the input device(s) of the I/O device(s) 120 may include, without limitation, a keyboard, a mouse, a touch-screen display, a controller(s), a remote(s), a headset, a stylus, a microphone, a camera, and/or other types of input devices. The output device(s) of the I/O component(s) 120 may include, without limitation, a speaker, a display, a light source, a haptic feedback device (e.g., a vibration motor), and/or other types of output devices. In some embodiments, as described herein, the AI agent device(s) 102 may leverage virtual or simulated I/O components—similar to the I/O component(s) 120 of the user device(s) 104—to communicate within the system 100. For a non-limiting example, communications from the AI agent may be captured from a virtual field of view of a virtual camera in a virtual environment and/or from a virtual audio sensor of a virtual microphone (or a virtual audio cable connected thereto) in a virtual environment. As such, the AI agent device(s) 102—e.g., using the renderer 114 and/or the AI engine 112—may capture data from within the virtual environment and/or corresponding to the AI agent using one or more virtual I/O components.

Figure 1B:
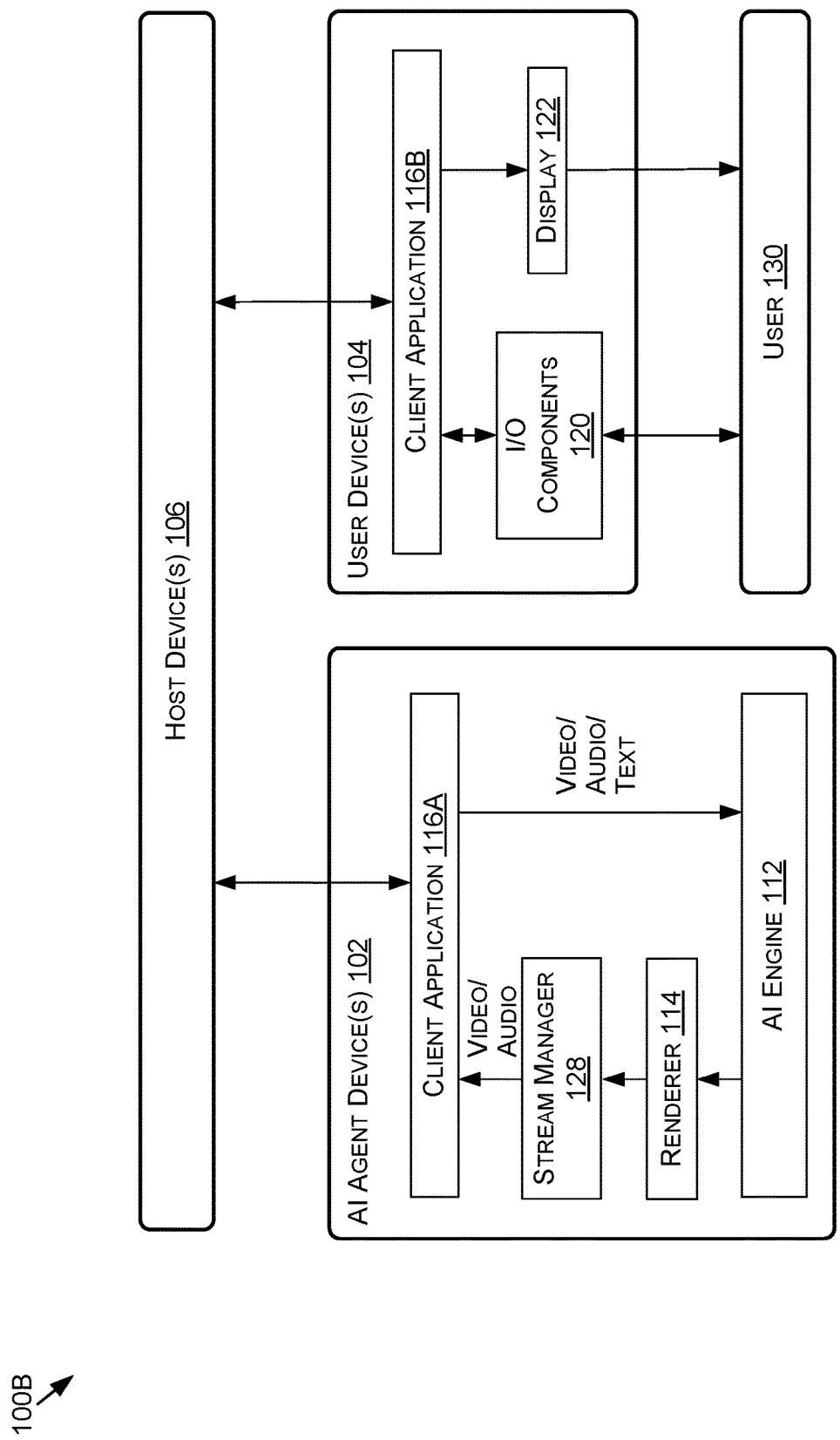
FIG. 1B depicts an example video conferencing system leveraging an AI assistant, in accordance with some embodiments of the present disclosure.

Now referring to FIG. 1B, the video conferencing system 100B may be used to host a video conference session including the AI agent via the AI agent device(s) 102 and one or more users via the user device(s) 104. In such an example, the client application 116A and 116B may correspond to end-user application versions of the video conferencing applications and the host device(s) 106 may include the host application 126 hosting the video conference session. The connection between the client applications 116A and 116B and the host application 126 may be via an email, a meeting invite, dial in, a URL, and/or another invitation means. For example, an AI agent—or the AI agent device(s) 102—may have a corresponding email handle, calendaring application connection, etc., that may allow the AI agent device(s) 102 to connect the AI agent to the conference. As such, similar to how a user 130 may join the video conference session via the user device(s) 104—e.g., using a link from an email or meeting invite, going to a URL, entering a meeting code, etc.—the AI agent device(s) 102 may connect the AI agent to the video conference session using any means of access.

For each user device 104, a user(s) 130 may provide inputs to one or more I/O components 120 and/or the I/O components 120 may generate data. For example, a camera—e.g., a web cam—may capture a video stream of its field of view (which may include the user), a microphone may capture an audio stream, and/or a keyboard, mouse, or other input devices may capture a textual stream or other input streams. In some embodiments, during some or all of the instance of the application, the AI agent and/or a virtual environment thereof may be presented on the display 122 based on received display data or image data corresponding to a rendering of graphical data representative of the virtual environment.

These streams of audio, video, and/or textual data may be received by the client application 116B and transmitted—e.g., after encoding—to the host device(s) 106, and the host device(s) 106 may analyze, process, transmit, and/or forward the data to the client application 116A of the AI agent device(s) 102. The AI engine 112 may access and/or receive the video, audio, and/or textual streams from the client application 116A and may process the data to determine a response or communication for the AI agent and/or the renderer 114 may generate any update(s) to the corresponding virtual environment. In some embodiments, notes, question and answer dialogue box information, and/or other information associated with the video conference may be received and processed by the AI engine 112. As such, once the textual, visual, and/or audible response or communication of the AI agent is determined, the AI agent and the virtual environment may be updated according thereto, and display data and/or image data generated from the graphical data—e.g., from a virtual field of view or one or more virtual sensors, such as cameras, microphones, etc.—may be rendered using the renderer 114. A stream manager 128 may receive the rendered data and generate a video stream, an audio stream, a textual stream, and/or encoded representations thereof, and provide this information to the client application 116A. In some embodiments, the stream manager 128 may leverage any suitable virtual camera software, such as the virtual camera feature provided by open broadcasting software (OBS). As a result, even though the AI agent is not a real entity—e.g., a user 130—the client application 116A may receive a video, audio, and/or textual stream representing the AI agent as if generated by any other user device(s) 104. As such, the client application 116A, the client application 116B, and/or the host application 126 may not require knowledge that the AI agent is present—e.g., the AI agent device(s) 102 may be treated by the host device(s) 106 as another user device(s) 104. The AI agent device(s) 102—and the features and functionality thereof—may be applied to any video conferencing platform without a requirement for an API corresponding to the AI agent, because the communication of the client application 116 with one or more existing APIs of the host application 126 may be enough to implement the AI agent in the video conference.

The host device(s) 106 may then analyze, process, transmit, and/or forward the video, audio, and/or textual streams corresponding to the AI agent to the user device(s) 104, and the client application 116B may cause presentation of the data via the display and/or output of the data (e.g., audio data) via the I/O component(s) 120.

This process may continue throughout the video conference during times when the AI agent is to be displayed or presented—e.g., the entire time, only after activation criteria are satisfied and until a given interaction is complete, the remainder of the time after activation criteria are satisfied, until the AI agent is asked to leave or removed from the conference, etc.

Figure 2A:
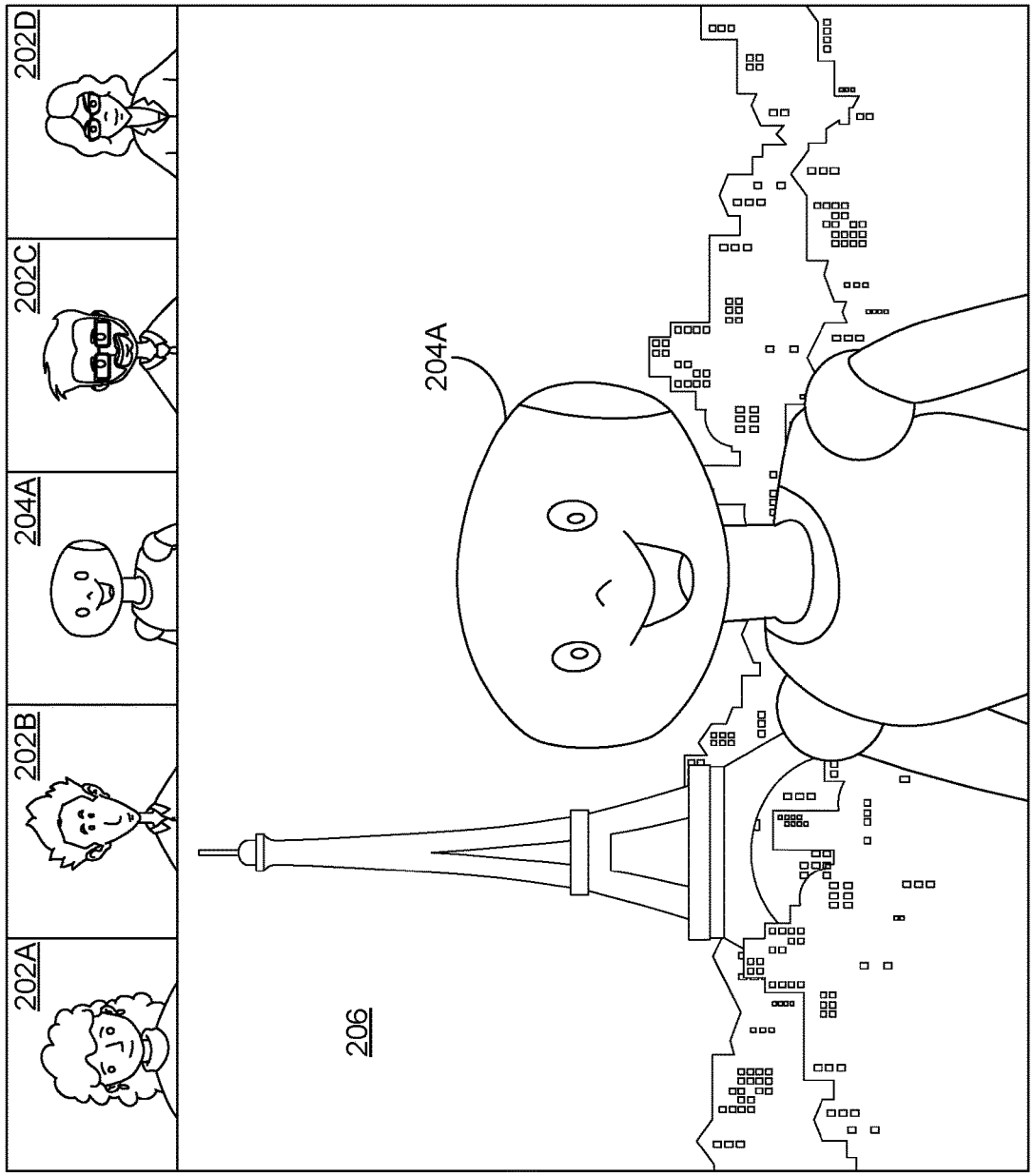

Now referring to FIG. 2A, visualization 200A may correspond to a screenshot of a video conference corresponding to a video conferencing application. Any number of users 202 (e.g., users 202A-202D) may participate in the video conference, and the video conference may include an AI agent 204A. The AI agent 204A may be represented to be within a virtual environment 206 corresponding to a virtual representation of Paris, France, including the Eiffel Tower to provide context for the location of the AI agent 204A to the other users 202. In such an embodiment, the AI agent 204 may be represented—in addition to the virtual environment 206—by graphical data, and the renderer 114 may generate video data from the graphical data, which may be transmitted as a video stream—via the host device(s) 106—to the user devices 104 associated with the users 202. In addition to the video stream, an audio stream and/or a textual stream may be transmitted such that the AI agent 204A may appear to, and interact with, the users 202 as any other user would. The virtual environment 206 may be used by the AI agent 204A to provide context to the conversation within the video conference. For example, when giving weather information, traffic information, time information, stock information, and/or any other information as a response or communication within the video conference, the AI agent 204A may leverage this virtual environment 206.

With reference to FIG. 2B, visualization 200B may correspond to a screenshot of a video conference corresponding to a video conferencing application. Any number of users 202 (e.g., users 202A-202D) may participate in the video conference, and the video conference may include an AI agent 204B. The AI agent 204b may be within a virtual environment 206 corresponding to a virtual—e.g., 3D—representation of an architectural plan 208 (or design), including a home. The architectural plan 208 may be loaded from a CAD file—e.g., using USD format—and used to generate the 3D representation of the plan 208 within the virtual environment 206. The AI agent 204B may use a pointer 210—or other object type, or a finger, etc.—to interact with the virtual representation of the home. For example, where one of the users is referencing a design of a window 212, the AI agent 204B may point to the window, and speak to the properties of the window (e.g., dimensions, materials, etc.) based on some conversation, gestures, and/or inputs form the users 202. In addition, where a change is requested, the AI engine 112 may leverage the renderer 114 to not only update the representation of the home in the virtual environment 206, but also to update the CAD file corresponding to the architectural plan 208. As a result, the AI agent 204B may use the contextual information available within the virtual environment to make updates to, point out, and/or otherwise interact with the home, while also updating the underlying file. In this way, the users 202 do not have to update the file during or after the video conference, and can leverage the AI agent 204B to act as the designer, or as a guide.

Figure 2C:
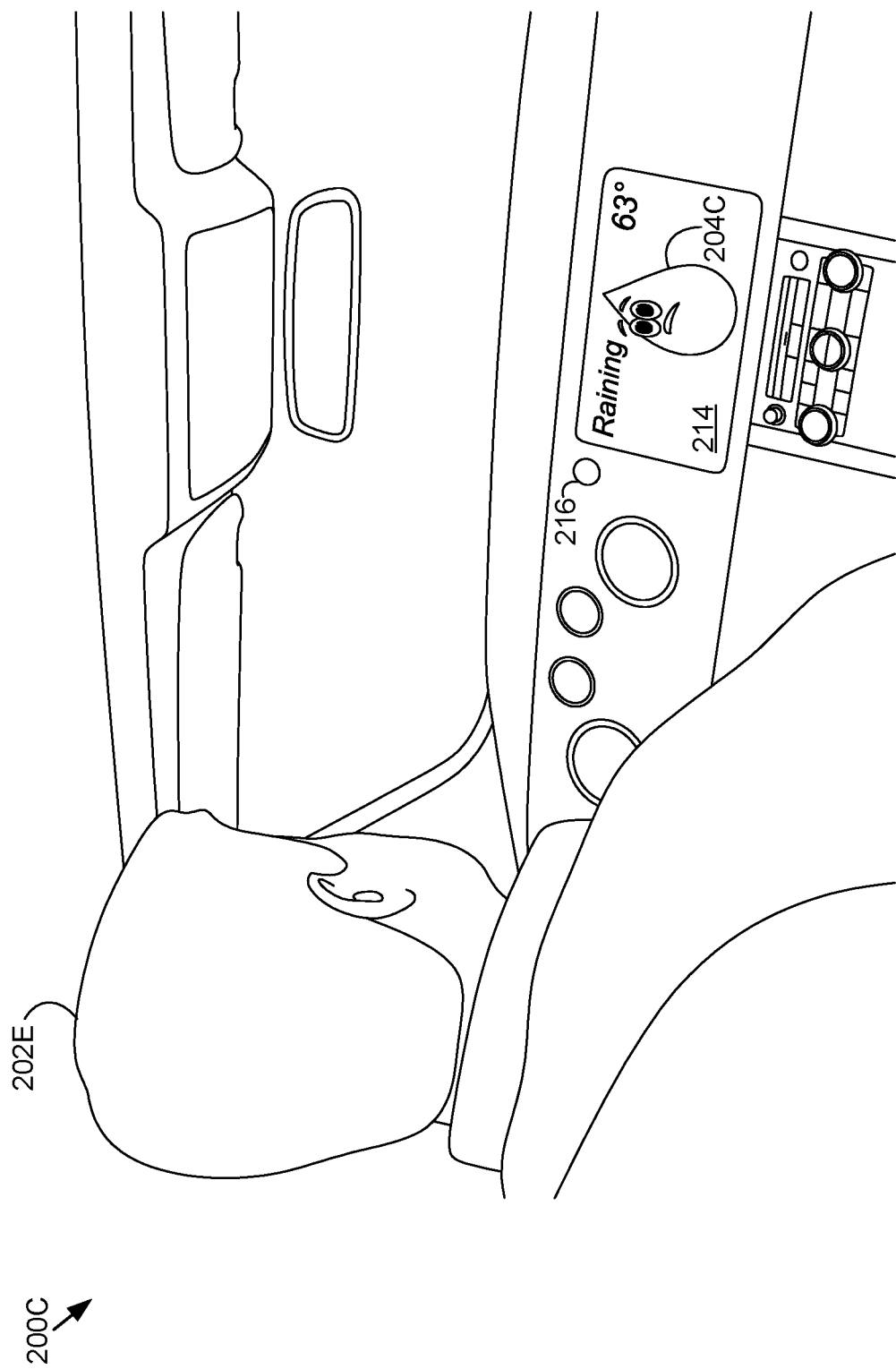

Now referring to FIG. 2C, visualization 200C may correspond to an automotive application where an AI agent 204C is presented on a display 214 of a dashboard. In this example, the AI agent 204C may correspond to a weather agent or weather bot, and user 204E may have asked—after satisfying the activation trigger—for the current weather either locally or at another location in the world. As such, the AI engine 112—which may be locally executed within a system on chip (SoC) of the vehicle and/or remotely executed and accessed via a cellular and/or satellite connection—may process the request and determine the current weather (e.g., 63 degrees and raining), while also generating a virtual environment including the text "Raining" and "63°", and including a graphical representation of the AI agent 204C with a sad face—e.g., determined as a result of the current precipitation. In addition, the AI agent 204C is represented as an avatar with a shape of a raindrop to indicate the AI agent's 204C domain of expertise—e.g., weather. In some embodiments, various different AI agent types may be accessible to the user 202, such as a music AI agent, a map AI agent, an in-vehicle control AI agent (e.g., for climate controls, activating lights, making a phone call, sending a text, etc.), a news AI agent, an in-vehicle entertainment AI agent, etc. As such, each AI agent may be represented by a different avatar, the same avatar, or a combination thereof. To activate a specific AI agent, the user 204E may request the AI agent by name, e.g., "Hey, Weather Agent," and/or the AI engine 112 may determine the proper agent based on the received audio (e.g., captured using a microphone in the vehicle), video (e.g., captured using camera 216), and/or textual data (e.g., input by the user such as to a touch-sensitive surface of the display 214).

Figure 2D:
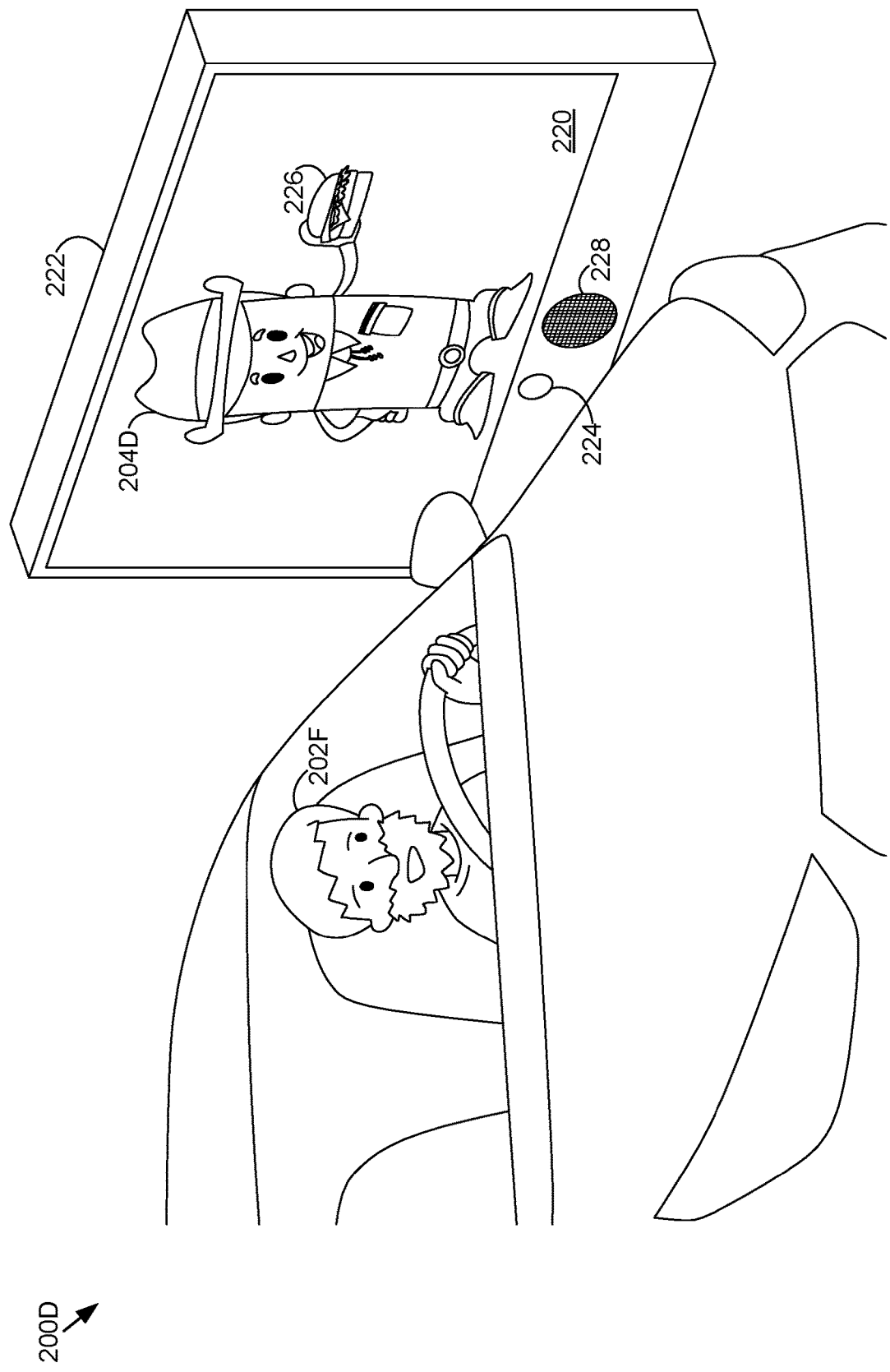

With reference to FIG. 2D, visualization 200D may correspond to a food-ordering application—e.g., fast food—where an AI agent 204D is presented on a display 220 of a menu-board 222. As illustrated, the menu-board 222 may not (only) include a textual menu, but a virtual environment of the AI agent 204D may be used to display the menu and/or allow the AI agent 204D to interact with or manipulate elements of the menu and/or virtual representations of objects (e.g., a cheeseburger 226) represented thereby—e.g., based on data received from user 202F via a microphone and/or camera 224 of the menu-board 222. For example, the user 202F may ask, "what ingredients are in that?" while pointing to a display of a cheeseburger, and the AI engine 112 may process this information (e.g., audible information and/or visual captured via a camera 224) and determine a response—visual and audible—that results in the AI agent 204D holding a graphical representation of the cheeseburger 226 and speaking about the various ingredients. Once completed, the virtual environment may be updated to display the menu on the display 220. Once an order is finalized, for example, the entire order may be generated within the virtual environment, and the AI agent 204D may point to a graphical depiction of each of the items while listing them off individually (e.g., audibly, as output by speaker 228) to verify an order. Similar AI agents may be implemented for food service on airplanes, at restaurants, food service stalls and kiosks, in stadiums (e.g., as accessed using a mobile ordering application), and/or the like.

Figure 2E:
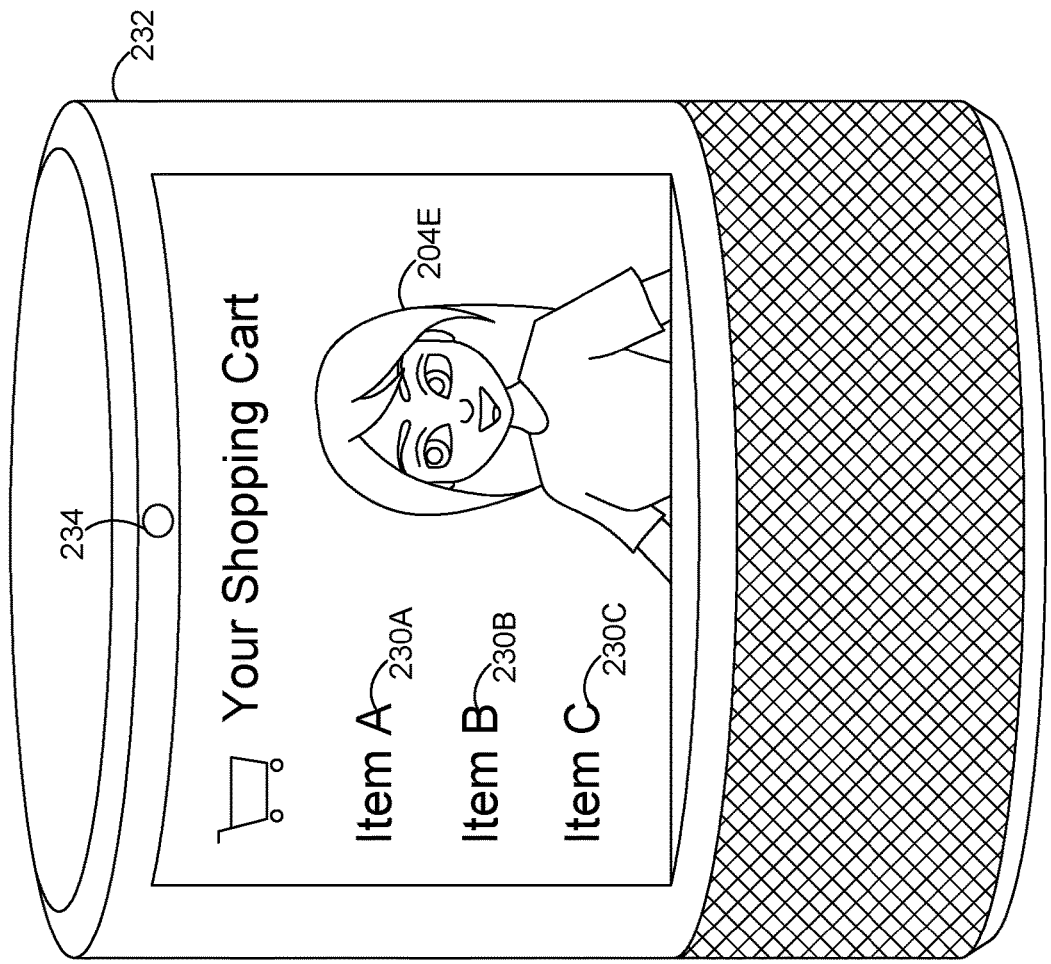

Now referring to FIG. 2E, visualization 200E may correspond to a shopping application hosted by a smart speaker/display 232. For example, a user (not shown) may request to add items to a shopping cart of a specific retail supplier, and the AI agent 204E—which may be an AI agent of the retail supplier and/or may be a general AI agent of the smart speaker/display or the company who manufactures the same—may be displayed in the context of the items 230A-230C requested. For example, the virtual environment of the AI agent 204E may include a virtual shopping cart, and the AI agent 204E may graphically interact with the shopping cart and/or contents of the shopping car to verify that requested items are accurate, to remove items no longer wanted, to answer questions related to items, and/or the like. As such, the AI agent 204E may be leveraged to search for items, add items to a shopping cart, purchase items, display graphical representations of items, etc., and based on audible, visual (e.g., captured via a camera 234), and/or textual data captured of the user.

Figure 3:
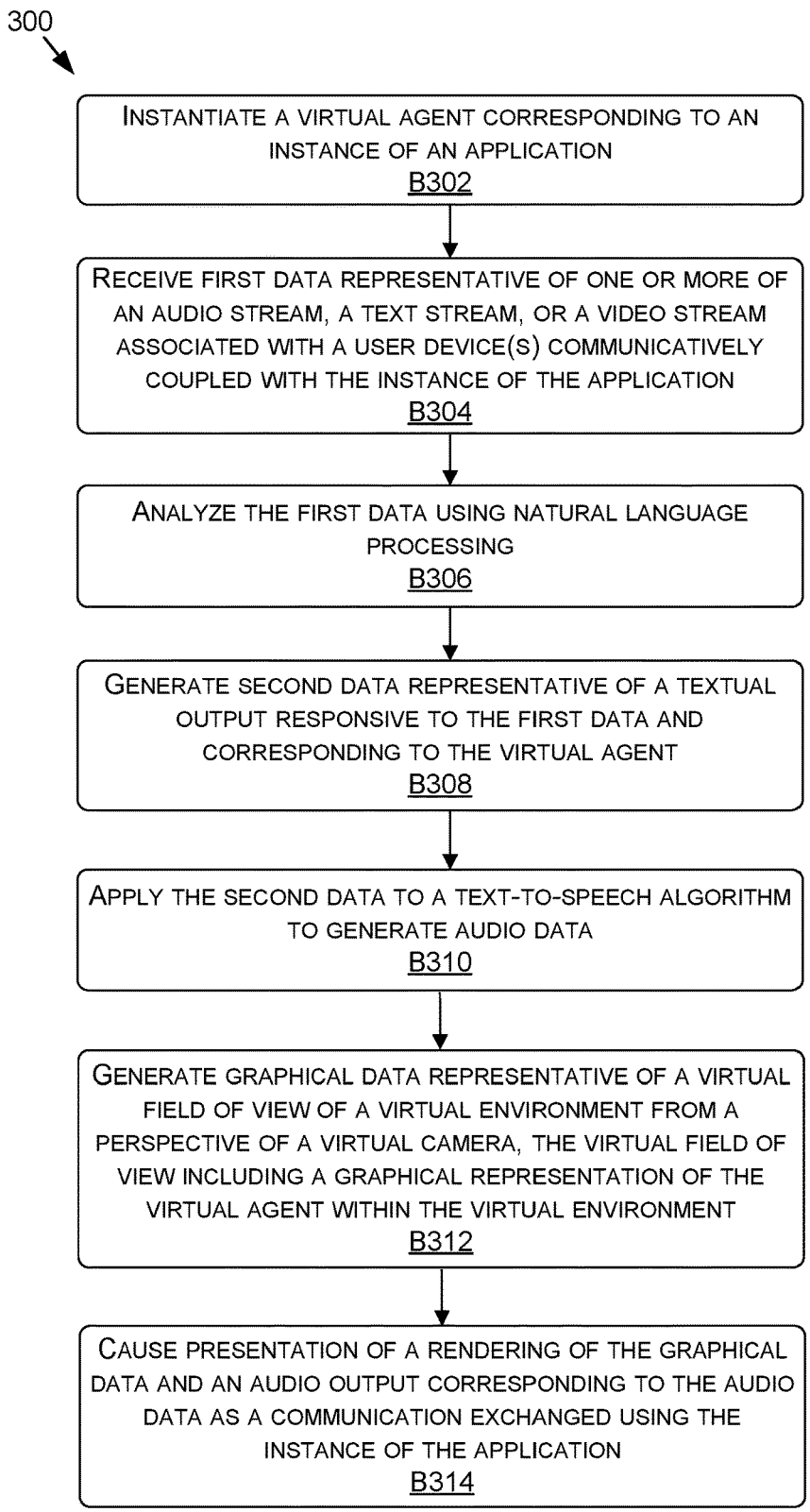
FIG. 3 is a flow diagram for a method of instantiating an AI assistant within an application, in accordance with some embodiments of the present disclosure.

With reference now to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the system of FIG. 1A. However, this method may additionally or alternatively be executed by any one system, or any combination of systems, including, but not limited to, those described herein.

FIG. 3 is a flow diagram showing a method 300 for instantiating an AI agent within an application, in accordance with some embodiments of the present disclosure. The method 300, at block B302, includes instantiating a virtual agent corresponding to an instance of an application. For example, the AI agent may be instantiated for communication within an instance of the client application 116A.

The method 300, at block B304, includes receiving first data representative of one or more of an audio stream, a text stream, or a video stream associated with a user device(s) communicatively coupled with the instance of the application. For example, an audio, video, and/or textual stream generated using a user device(s) 104 may be received—e.g., by the AI agent device(s) 102.

The method 300, at block B306, includes analyzing the first data using natural language processing. For example, the received data may be analyzed by the AI engine 112 (executed by, for example and without limitation, one or more parallel processing units), which may include applying natural language processing to the data.

The method 300, at block B308, includes generating second data representative of a textual output responsive to the first data and corresponding to the virtual agent. For example, the AI engine 112 may generate text that corresponds to a verbal response of the AI agent.

The method 300, at block B310, includes applying the second data to a text-to-speech algorithm to generate audio data. For example, the textual data corresponding to the response or communication of the AI agent may be applied to a text-to-speech algorithm to generate audio data.

The method 300, at block B312, includes generating graphical data representative of a virtual field of view of a virtual environment from a perspective of a virtual camera, the virtual field of view including a graphical representation of the virtual agent within the virtual environment. For example, the renderer 114 may generate the graphical data representative of a virtual field of view of the virtual environment from a perspective of a virtual camera, and the virtual field of view may include a graphical representation of the AI agent. For example, the AI agent may be represented as responding verbally and/or physically—e.g., via simulated gestures, postures, movements, actions, etc.—and the virtual environment may be generated to provide context to the response.

The method 300, at block B314, includes causing presentation of a rendering of the graphical data and an audio output corresponding to the audio data as a communication exchanged using the instance of the application. For example, the renderer 114 may generate display data or image data corresponding to the graphical data, and audio data, and/or textual data may also be rendered or generated. This display or image data, audio data, and/or textual data may then be transmitted to the user device(s) 104—via the host device(s) 106, in embodiments—as an audio stream, a video stream, and/or a textual stream for output by the user device(s) 104.

Example Computing Device

Figure 4:
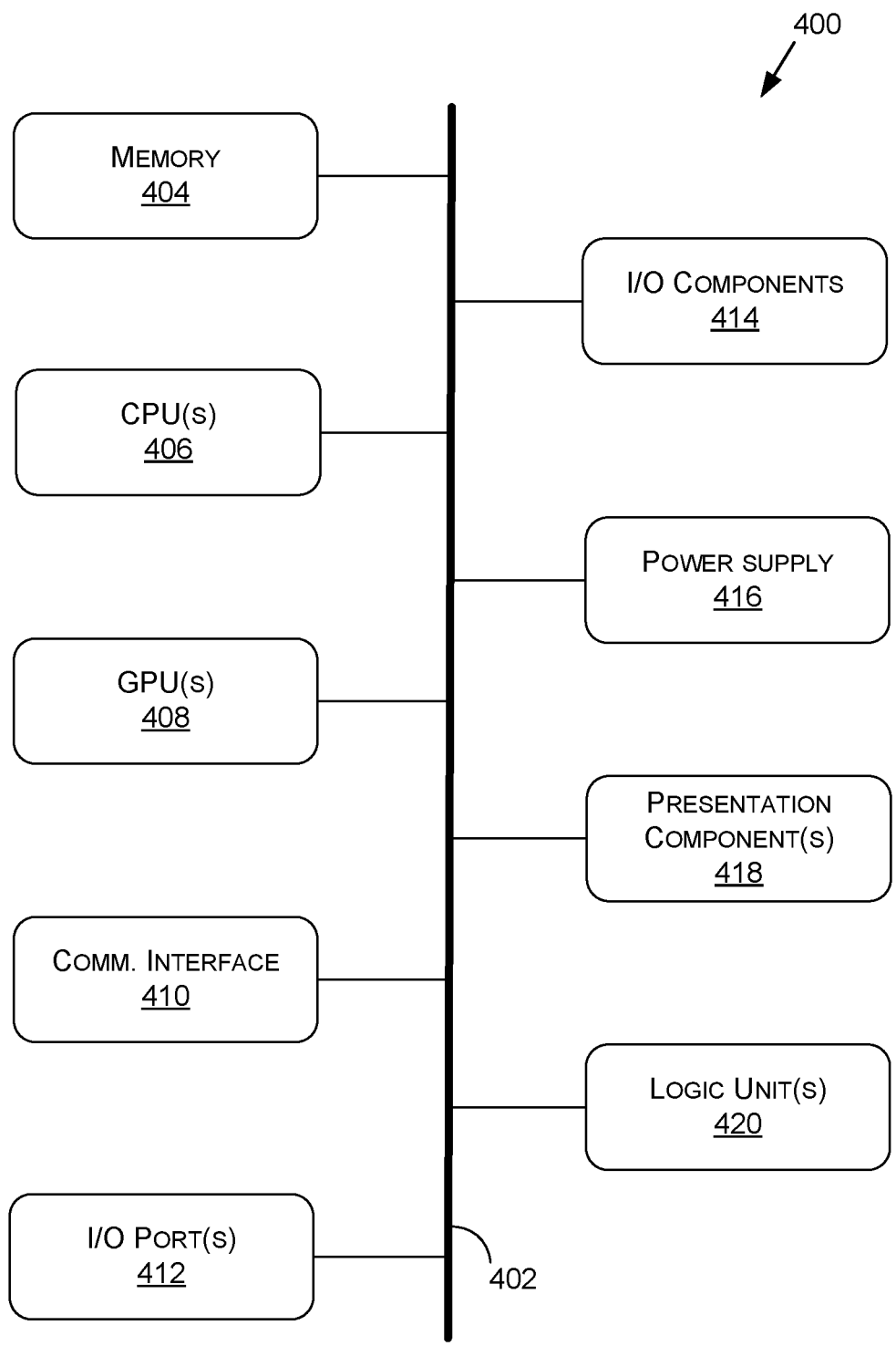
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420. In at least one embodiment, the computing device(s) 400 may comprise one or more virtual machines (VMs), and/or any of the components thereof may comprise virtual components (e.g., virtual hardware components). For non-limiting examples, one or more of the GPUs 408 may comprise one or more vGPUs, one or more of the CPUs 406 may comprise one or more vCPUs, and/or one or more of the logic units 420 may comprise one or more virtual logic units. As such, a computing device(s) 400 may include discrete components (e.g., a full GPU dedicated to the computing device 400), virtual components (e.g., a portion of a GPU dedicated to the computing device 400), or a combination thereof.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 420 and/or communication interface 410 may include one or more data processing units (DPUs) to transmit data received over a network and/or through interconnect system 402 directly to (e.g., a memory of) one or more GPU(s) 408.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, DPUs, etc.), and output the data (e.g., as an image, video, sound, etc.).

Example Data Center

Figure 5:
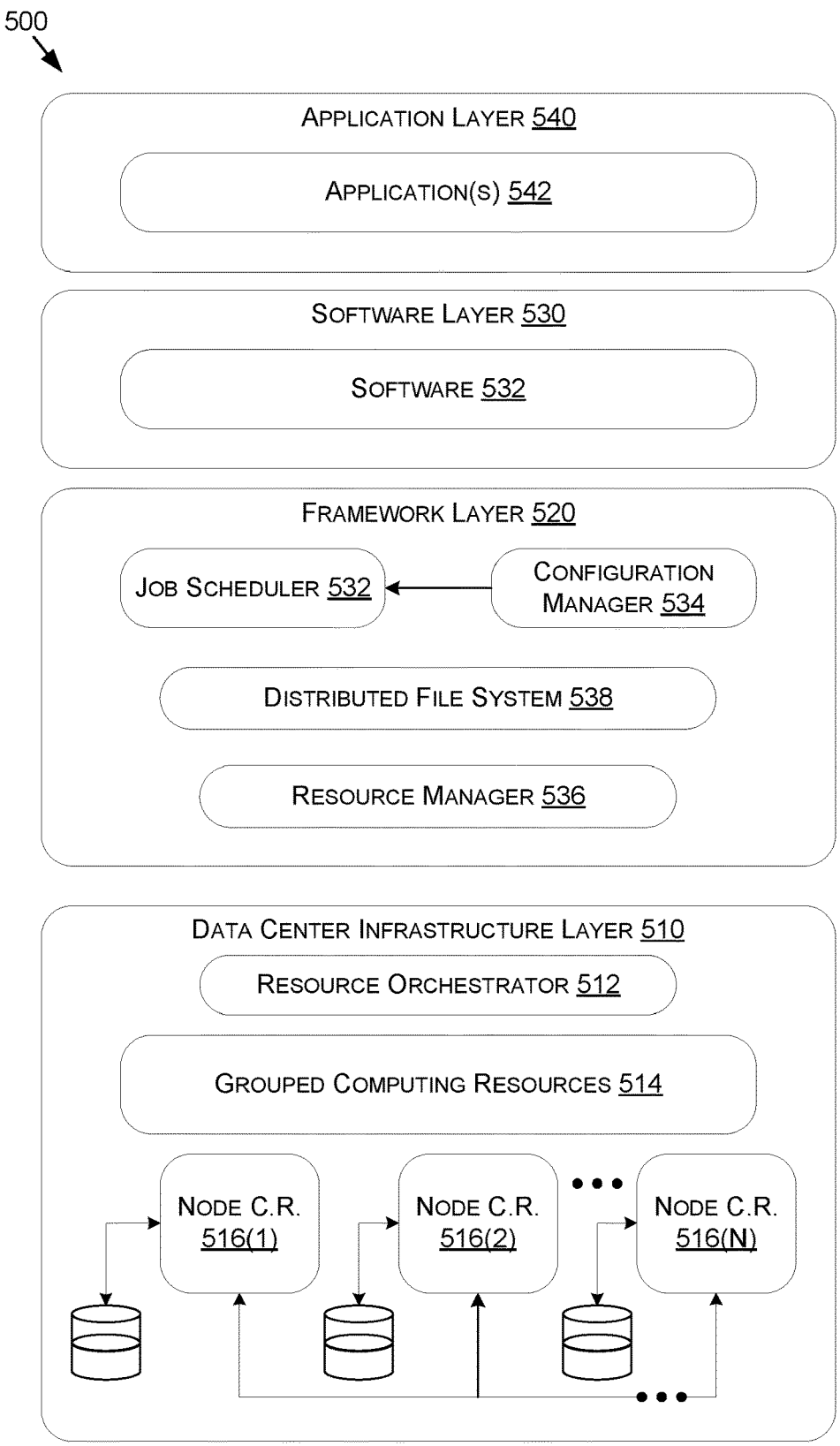
FIG. 5 is a block diagram of an example data center suitable for use in implementing some embodiments of the present disclosure.

FIG. 5 illustrates an example data center 500 that may be used in at least one embodiments of the present disclosure. The data center 500 may include a data center infrastructure layer 510, a framework layer 520, a software layer 530, and/or an application layer 540.

As shown in FIG. 5, the data center infrastructure layer 510 may include a resource orchestrator 512, grouped computing resources 514, and node computing resources ("node C.R.s") 516(1)-516(N), where "N" represents any whole, positive integer. In at least one embodiment, node C.R.s 516(1)-516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 516(1)-516(N) may correspond to a server having one or more of the above-mentioned computing resources. In addition, in some embodiments, the node C.R.s 516(1)-5161(N) may include one or more virtual components, such as vGPUs, vCPUs, and/or the like, and/or one or more of the node C.R.s 516(1)-516(N) may correspond to a virtual machine (VM).

In at least one embodiment, grouped computing resources 514 may include separate groupings of node C.R.s 516 housed within one or more racks (not shown), or many racks housed in data centers at various geographical locations (also not shown). Separate groupings of node C.R.s 516 within grouped computing resources 514 may include grouped compute, network, memory or storage resources that may be configured or allocated to support one or more workloads. In at least one embodiment, several node C.R.s 516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 512 may configure or otherwise control one or more node C.R.s 516(1)-516(N) and/or grouped computing resources 514. In at least one embodiment, resource orchestrator 512 may include a software design infrastructure (SDI) management entity for the data center 500. The resource orchestrator 512 may include hardware, software, or some combination thereof.

In at least one embodiment, as shown in FIG. 5, framework layer 520 may include a job scheduler 532, a configuration manager 534, a resource manager 536, and/or a distributed file system 538. The framework layer 520 may include a framework to support software 532 of software layer 530 and/or one or more application(s) 542 of application layer 540. The software 532 or application(s) 542 may respectively include web-based service software or applications, such as those provided by Amazon Web Services, Google Cloud and Microsoft Azure. The framework layer 520 may be, but is not limited to, a type of free and open-source software web application framework such as Apache Spark™ (hereinafter "Spark") that may utilize distributed file system 538 for large-scale data processing (e.g., "big data"). In at least one embodiment, job scheduler 532 may include a Spark driver to facilitate scheduling of workloads supported by various layers of data center 500. The configuration manager 534 may be capable of configuring different layers such as software layer 530 and framework layer 520 including Spark and distributed file system 538 for supporting large-scale data processing. The resource manager 536 may be capable of managing clustered or grouped computing resources mapped to or allocated for support of distributed file system 538 and job scheduler 532. In at least one embodiment, clustered or grouped computing resources may include grouped computing resource 514 at data center infrastructure layer 510. The resource manager 536 may coordinate with resource orchestrator 512 to manage these mapped or allocated computing resources.

In at least one embodiment, software 532 included in software layer 530 may include software used by at least portions of node C.R.s 516(1)-516(N), grouped computing resources 514, and/or distributed file system 538 of framework layer 520. One or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1)-516(N), grouped computing resources 514, and/or distributed file system 538 of framework layer 520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 534, resource manager 536, and resource orchestrator 512 may implement any number and type of self-modifying actions based on any amount and type of data acquired in any technically feasible fashion. Self-modifying actions may relieve a data center operator of data center 500 from making possibly bad configuration decisions and possibly avoiding underutilized and/or poor performing portions of a data center.

The data center 500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 500. In at least one embodiment, trained or deployed machine learning models corresponding to one or more neural networks may be used to infer or predict information using resources described above with respect to the data center 500 by using weight parameters calculated through one or more training techniques, such as but not limited to those described herein.

In at least one embodiment, the data center 500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 400 of FIG. 4—e.g., each device may include similar components, features, and/or functionality of the computing device(s) 400. In addition, where backend devices (e.g., servers, NAS, etc.) are implemented, the backend devices may be included as part of a data center 500, an example of which is described in more detail herein with respect to FIG. 5.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 400 described herein with respect to FIG. 4. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A processor comprising:
processing circuitry to:
   instantiate a first virtual agent corresponding to an instance of a first application that is hosted using one or more first computing devices;
   send, to the one or more first computing devices and using one or more wireless networks, first data that causes a first presentation of a first graphical representation of the first virtual agent using one or more first client devices that are communicating with the one or more first computing devices;
   receive, from the one or more first computing devices and using the one or more wireless networks, sensor data representative of at least one of a video of a user or user speech from the user, the sensor data generated using the one or more first client devices;
   generate, based at least on the sensor data, a second presentation of a second graphical representation of the first virtual agent along with an audio output that is responsive to the user speech;
   send, to the one or more first computing devices and using the one or more wireless networks, second data that causes the second presentation of the second graphical representation of the first virtual agent along with the audio output using the one or more first client devices;
   initiate a second virtual agent corresponding to an instance of a second application that is hosted using a one or more second computing devices; and
   send, to the one or more second computing devices and using the one or more wireless networks, third data that causes a third presentation of a third graphical representation of the second virtual agent using one or more second client devices that are communicating with the one or more second computing devices.

2. The processor of claim 1, wherein the first application is at least one of a video conferencing application, an in-cabin application of a vehicle, a food or beverage ordering application, a computer aided design (CAD) application, a customer service application, a web service application, a smart speaker or smart display application, a retail application, a financial application, or a food service application.

3. The processor of claim 1, wherein the instantiation of the first virtual agent is based at least on an invite sent to the one or more first computing devices hosting the first virtual agent.

4. The processor of claim 1, wherein the instantiation of the first virtual agent is based at least on data representative of at least one of a textual trigger, an audible trigger, or a visual trigger.

5. The processor of claim 1, further comprising processing circuitry to:
determine, based at least on the sensor data, that the user is looking towards the first virtual agent,
wherein the generation of the second presentation is based at least on the user looking towards the first virtual agent.

6. The processor of claim 1, wherein the generation of the second presentation is further based at least on determining, using the sensor data, that the user is looking at a camera associated with the instance of the first application and that the user accounts for at least a portion of the user speech.

7. The processor of claim 6, wherein the determination that the user accounts for the at least the portion of the user speech is based at least on one or more lip movements of the user.

8. The processor of claim 1, further comprising processing circuitry to analyze the sensor data using one or more algorithms configured to perform at least one of natural language processing, automatic speech recognition, or computer vision analysis.

9. The processor of claim 1, further comprising processing circuitry to:
analyze at least a subset of the sensor data using one or more deep neural networks (DNNs); and
identify the user based at least on analysis.

10. The processor of claim 1, wherein the uses at least one of a virtual camera that captures the second graphical representation of the first virtual agent or a virtual microphone that captures the audio output from the first virtual agent.

11. The processor of claim 1, further comprising processing circuitry to apply the second data to a lip synchronization application such that at least a portion of the second graphical representation of the first virtual agent simulates motions corresponding to a pronunciation of the audio output.

12. The processor of claim 1, further comprising processing circuitry to:
access a data file corresponding to a virtual environment; and
generate graphical data representative of the first virtual agent depicted within the virtual environment,
wherein the second presentation further includes rendering the graphical data such that the first virtual agent is depicted within the virtual environment.

13. The processor of claim 12, wherein the data file is accessed based at least on contextual information, the contextual information including at least one of a location, an item, a structure, or a project.

14. The processor of claim 12, wherein the rendering of the graphical data is generated by executing one or more ray-tracing techniques using one or more parallel processing units.

15. The processor of claim 12, wherein the virtual environment is a first virtual environment, and wherein during execution of the instance of the first application, second graphical data is generated representative of the first virtual agent depicted within a second virtual environment, the first virtual environment being different from the second virtual environment.

16. The processor of claim 1, further comprising processing circuitry to instantiate one or more third virtual agents corresponding to the instance of the first application, an individual virtual agent of the one or more third virtual agents being associated with at least one skill or domain different from each other virtual agent.

17. The processor of claim 1, wherein the instantiation of the first virtual agent is based at least on data representative of a request for the first virtual agent, the request being represented at least one of textually, visually, or audibly.

18. The processor of claim 1, further comprising processing circuitry to:
determine, based at least on the sensor data, an emotional characteristic of the user,
wherein the generation of the second presentation is further based at least on the emotional condition.

19. The processor of claim 1, wherein the generation of the second presentation is further based at least on determining that a multimodal trigger has been satisfied.

20. The processor of claim 1, further comprising processing circuitry to:
analyze the sensor data to determine contextual information; and
generate, based at least on the contextual information, a background,
wherein the second presentation uses the background.

21. The processor of claim 1, further comprising processing circuitry to:
analyze the sensor data to determine, based at least on a gaze of the user, that the user is engaged with the first virtual agent,
wherein the generation of the second presentation is further based at least on the user being engaged with the first virtual agent.

22. The processor of claim 1, wherein the video further depicts a second user, and further comprising processing circuitry to generate the second graphical representation such that the first virtual agent is focused on the user based at least on the user being associated with the user speech.

23. The processor of claim 1, further comprising processing circuitry to:
determine, based at least on the sensor data, that the user is making a trigger gesture,
wherein the generation of the second presentation is based at least on the user making the trigger gesture.

24. The processor of claim 1, wherein:
the first graphical representation of the first virtual agent is associated with the first virtual agent refraining from interacting with one or more users; and
the second graphical representation of the first virtual agent is associated with the first virtual agent interacting with the user.

25. A method comprising:
initiating, using a first system, a first virtual agent corresponding to an instance of a first application that is hosted using a second system;
sending, using the first system and to the second system via one or more wireless networks, first data that causes a first presentation of a first graphical representation of the first virtual agent using one or more first client devices that are communicating with the second system;
receiving, using the first system and from the second system via the one or more wireless networks, sensor data representative of at least one of a video depicting a user or user speech, the sensor data generated using the one or more first client devices;

generating, based at least on the sensor data, a second presentation of a second graphical representation of the virtual agent along with an audible output corresponding to the user speech;

sending, using the first system and to the second system via the one or more wireless networks, second data that causes the second presentation of the second graphical representation of the virtual agent along with the audible output using the one or more client devices;

initiating, using the first system, a second virtual agent corresponding to an instance of a second application that is hosted using a third system; and sending, using the first system and to the third system via the one or more wireless networks, third data that causes a third presentation of a third graphical representation of the second virtual agent using one or more second client devices that are communicating with the third system.

26. The method of claim 25, wherein the generating the second presentation uses at least one of a virtual camera that captures the second graphical representation of the first virtual agent or a virtual microphone that captures the audible output from the first virtual agent.

27. The method of claim 25, further comprising:
encoding the second data to generate encoded data,
wherein the sending the second data comprises sending the encoded data.

28. The method of claim 25, further comprising generating the second representation using a deep neural network to determine a representation of an emotional state of the first virtual agent.

29. The method of claim 28, wherein the emotional state is determined based at least on a user emotional state determined based at least on the sensor data.

30. The method of claim 25, wherein the sending the second data further causes the second presentation of the second graphical representation of the first virtual agent along with the audible output using one or more third client devices.

31. The method of claim 25, further comprising determining one or more objects based at least on the user speech, wherein the second representation includes the one or more objects.

32. The method of claim 25, further comprising:
determining, based at least on a request, a background environment,
wherein the second representation corresponds to the first virtual agent located within the background environment.

33. The method of claim 25, further comprising:
determining that the sensor data represents the user speech;
wherein the generating the second presentation is based at least on the user speech.

34. The method of claim 25, further comprising:
determining that the sensor data represents the one or more triggering words;
wherein the generating the second presentation is based at least on the one or more triggering words.

35. A system comprising:
one or more processors to:
instantiate a first virtual agent corresponding to an instance of a first application that is hosted using one or more first computing devices;
send, to the one or more first computing devices, first data that causes a first presentation of a first graphical representation of the first virtual agent using one or more first client devices;
receive, from the one or more first computing devices, sensor data representative of at least one of a video of a user or user speech from the user, the sensor data generated using the one or more first client devices;
generate, based at least on the sensor data, a second presentation of a second graphical representation of the first virtual agent along with an audio output responsive to the user speech;
send, to the one or more first computing devices, second data that causes the second presentation of second graphical representation of the first virtual agent along with the audio output using the one or more first client devices;
initiate a second virtual agent corresponding to an instance of a second application that is hosted using a one or more second computing devices; and
send, to the one or more second computing devices, third data that causes a third presentation of a third graphical representation of the second virtual agent using one or more second client devices that are communicating with the one or more second computing devices.

36. The system of claim 35, wherein the one or more processors are further to:
determine, based at least on the sensor data, that the user is looking at the first virtual agent,
wherein the generation of the second presentation is based at least on the user looking at the first virtual agent.

37. The system of claim 35, wherein at least one of:
the second virtual agent include a same virtual agent as the first virtual agent; or
the second virtual agent is different than the first virtual agent.

* * * * *